(12) United States Patent
Ogawa

(10) Patent No.: US 12,039,022 B2
(45) Date of Patent: Jul. 16, 2024

(54) PROCESSING SYSTEM AND PROCESSING METHOD

(71) Applicant: NEC CORPORATION, Tokyo (JP)

(72) Inventor: Shingo Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 677 days.

(21) Appl. No.: 16/787,166

(22) Filed: Feb. 11, 2020

(65) Prior Publication Data
US 2020/0265130 A1 Aug. 20, 2020

(30) Foreign Application Priority Data

Feb. 15, 2019 (JP) ................................. 2019-025821

(51) Int. Cl.
*G06F 21/32* (2013.01)
*G07C 5/02* (2006.01)
(Continued)

(52) U.S. Cl.
CPC ............... *G06F 21/32* (2013.01); *G07C 5/02* (2013.01); *G06Q 2240/00* (2013.01);
(Continued)

(58) Field of Classification Search
CPC .................. G07C 5/02; G07C 9/30–38; G07C 2009/00928; G07C 5/00–12; G07C 9/00563; G07C 9/22–26; G07C 9/32–37; G07C 2209/63–65; G07C 5/008; G07C 9/005–00571; G07C 2209/00801–00888; G07C 9/00–38;
(Continued)

(56) References Cited

U.S. PATENT DOCUMENTS

2005/0055582 A1* 3/2005 Bazakos .............. G06V 40/161
  726/19
2017/0372143 A1* 12/2017 Barcus ..................... G06F 7/10
(Continued)

FOREIGN PATENT DOCUMENTS

JP  2003-166818 A  6/2003
JP  2007-504557 A  3/2007
(Continued)

OTHER PUBLICATIONS

JP Office Action for JP Application No. 2019-025821, dated Nov. 22, 2022 with English Translation.

*Primary Examiner* — Amr A Awad
*Assistant Examiner* — Aaron Midkiff
(74) *Attorney, Agent, or Firm* — Sughrue Mion, PLLC

(57) ABSTRACT

Provided is a processing system including a moving body identification information acquisition unit that acquires moving body identification information for identifying a moving body, an authentication unit that executes an inspector authentication process, based on biological information of an inspector, an inspection item identification information acquisition unit that acquires inspection item identification information for identifying an inspection item, and an output unit that stores the moving body identification information, the inspection item identification information, and inspector identification information of the inspector which is authenticated in the inspector authentication process in a storage unit in association with each other.

11 Claims, 17 Drawing Sheets

(51) Int. Cl.
*G06V 40/10* (2022.01)
*G06V 40/12* (2022.01)
*G06V 40/14* (2022.01)
*G06V 40/16* (2022.01)
*G06V 40/18* (2022.01)

(52) U.S. Cl.
CPC .......... *G06V 40/10* (2022.01); *G06V 40/1365* (2022.01); *G06V 40/14* (2022.01); *G06V 40/172* (2022.01); *G06V 40/197* (2022.01)

(58) Field of Classification Search
CPC ............. G07C 2009/0019–00992; G07C 9/00896–00912; G07C 9/10–15; G07C 2009/0092–00936; G07C 2009/63–65; G07C 5/22–26; G07C 5/32–37; G06V 40/10–197; G06V 40/00–70; G06V 40/12–1394; G06V 20/00–95; G06V 40/16–179; G06V 20/59–597; G06V 40/1365; G06V 40/14; G06V 40/172; G06Q 2240/00; G06Q 10/20; G06Q 50/28; G06F 21/32; G06F 16/58–587; G06F 16/38–387; G06F 16/00–986; G06F 21/30–36; G06F 2221/21–2153; G07B 15/063; G07B 15/00–066; G08B 5/00–40; G08B 13/00–26; G08B 25/00–14; E04H 6/42–428; B60R 16/0234; B60R 25/307; B60R 25/25–257; B60T 17/18–228; B60S 5/00–06; A61B 5/117; G08G 1/00–22; G08G 1/14–149; G06T 2207/30248–30268; G06T 2207/30196; G06T 2207/30201
See application file for complete search history.

(56) References Cited

U.S. PATENT DOCUMENTS

| | | | |
|---|---|---|---|
| 2019/0228383 A1* | 7/2019 | Abler | G06Q 10/20 |
| 2019/0279437 A1* | 9/2019 | Borras | G07B 15/063 |
| 2021/0174065 A1* | 6/2021 | Kumagai | B60Q 9/00 |

FOREIGN PATENT DOCUMENTS

| | | | |
|---|---|---|---|
| JP | 2015-124514 A | 7/2015 | |
| JP | 2019-021280 A | 2/2019 | |
| JP | 2020-101880 A | 7/2020 | |
| WO | 2005/032895 A1 | 4/2005 | |
| WO | WO-2018116373 A1 * | 6/2018 | B60N 2/002 |

* cited by examiner

FIG. 4

| INSPECTOR IDENTIFICATION INFORMATION | BIOLOGICAL INFORMATION |
|---|---|
| MH3195 | ✳✳✳✳ |
| ⋮ | ⋮ |

FIG. 5

ENTRANCE HISTORY

| ENTRANCE DATE AND TIME | INSPECTOR IDENTIFICATION INFORMATION |
|---|---|
| JANUARY 18, 2019 13:19 | MH3195 |
| ⋮ | ⋮ |

FIG. 12

ENTRANCE HISTORY

| ENTRANCE DATE AND TIME | INSPECTOR IDENTIFICATION INFORMATION | MOVING BODY IDENTIFICATION INFORMATION |
|---|---|---|
| JANUARY 18, 2019 13:19 | MH3195 | MCH031185 |
| ⋮ | ⋮ | ⋮ |

FIG. 15

| INSPECTION ITEM IDENTIFICATION INFORMATION | TERMINAL IDENTIFICATION INFORMATION |
|---|---|
| P001 | CC313 |
| ⋮ | ⋮ |

FIG. 16

```
MOVING BODY IDENTIFICATION INFORMATION : MCH031185

(1)  INSPECTION ITEM
     IDENTIFICATION INFORMATION    : P001

INSPECTOR IDENTIFICATION
     INFORMATION                   : MH3195

INSPECTION RESULT             : Pass

INSPECTION EXECUTION
     DATE AND TIME                 : JANUARY 18, 2019 14:31

(2)  INSPECTION ITEM
     IDENTIFICATION INFORMATION    : P002

INSPECTOR IDENTIFICATION
     INFORMATION                   : MH3195

INSPECTION RESULT             : Fail (SMUDGE ON FRONT)

INSPECTION EXECUTION
     DATE AND TIME                 : JANUARY 18, 2019 15:12

⋮
```

PROCESSING SYSTEM AND PROCESSING METHOD

This application is based on Japanese patent application No. 2019-025821, the content of which is incorporated hereinto by reference.

BACKGROUND

Technical Field

The invention relates to a processing system and a processing method.

Related Art

Pamphlet of International Publication No. 2005/032895 discloses a technique of capturing an image of an occupant seating in a seat of a vehicle by using a camera installed in the vehicle and executing an authentication process based on the captured image.

SUMMARY

There is a problem that an unqualified person inspects the vehicle. Pamphlet of International Publication No. 2005/032895 does not disclose the problem and means for solving it. An object of the present invention is to suppress the occurrence of inconvenience in which an unqualified person inspects a moving body such as a vehicle.

In one example embodiment, there is provided a processing system including: a moving body identification information acquisition unit that acquires moving body identification information for identifying a moving body; an authentication unit that executes an inspector authentication process, based on biological information of an inspector; an inspection item identification information acquisition unit that acquires inspection item identification information for identifying an inspection item; and an output unit that stores the moving body identification information, the inspection item identification information, and inspector identification information of the inspector which is authenticated in the inspector authentication process in a storage unit in association with each other.

In another example embodiment, there is provided a processing method executed by a computer, the method including: acquiring moving body identification information for identifying a moving body; executing an inspector authentication process, based on biological information of an inspector; acquiring inspection item identification information for identifying an inspection item; and storing the moving body identification information, the inspection item identification information, and inspector identification information of the inspector which is authenticated in the inspector authentication process in a storage unit in association with each other.

According to the present invention, it is possible to suppress the occurrence of inconvenience in which an unqualified person inspects a moving body such as a vehicle.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 4 is a diagram schematically illustrating an example of information processed by the processing system of the present example embodiment;

FIG. 5 is a diagram schematically illustrating an example of information processed by the processing system of the present example embodiment;

FIG. 12 is a diagram schematically illustrating an example of information processed by the processing system of the present example embodiment;

FIG. 15 is a diagram schematically illustrating an example of information processed by the processing system of the present example embodiment;

FIG. 16 is a diagram schematically illustrating an example of information processed by the processing system of the present example embodiment;

DETAILED DESCRIPTION

Figure 1:
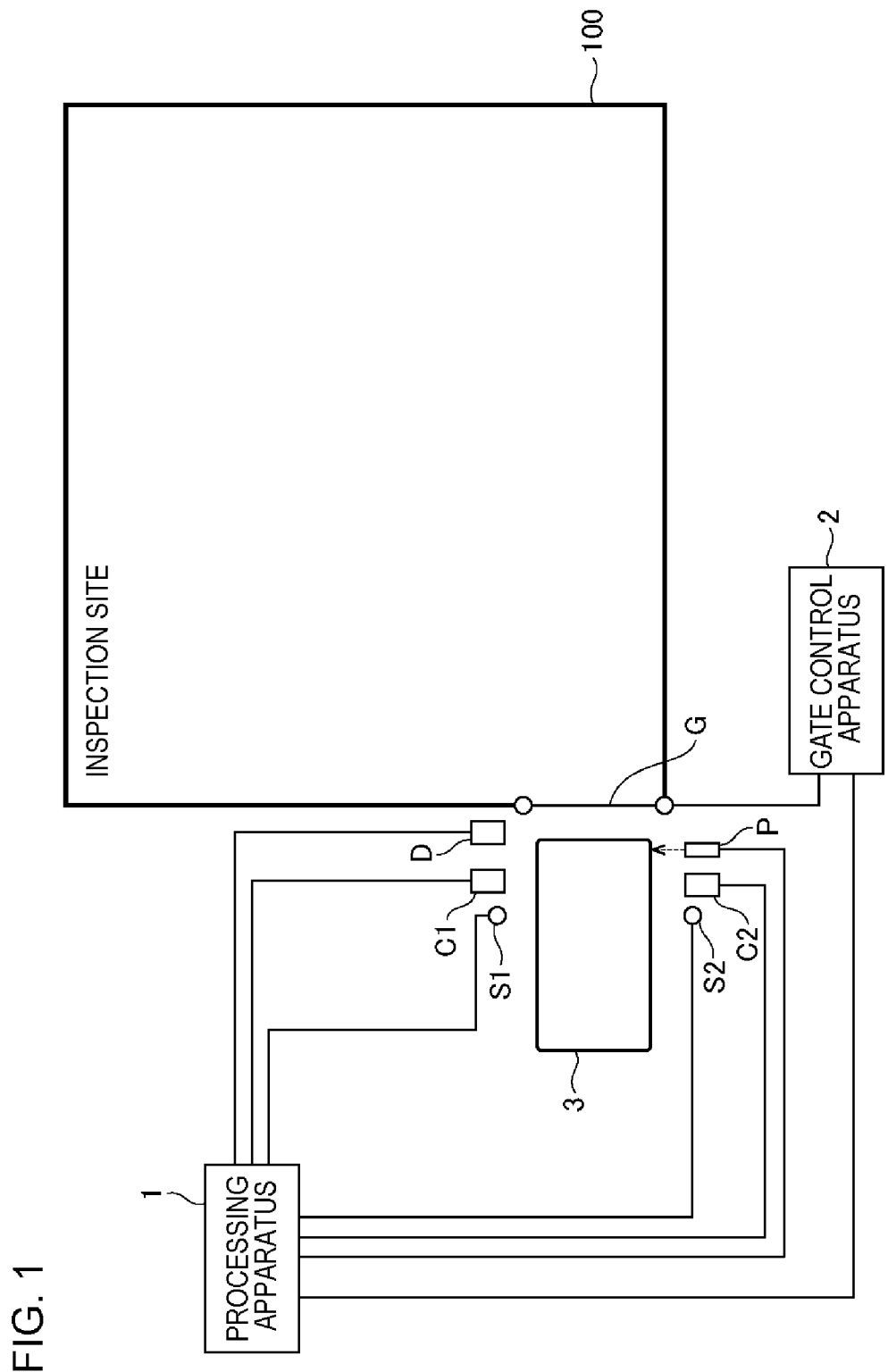
FIG. 1 is a diagram illustrating an example of an overall image of a processing system according to the present example embodiment.

The invention will be now described herein with reference to illustrative embodiments. Those skilled in the art will recognize that many alternative embodiments can be accomplished using the teachings of the present invention and that the invention is not limited to the example embodiments illustrated for explanatory purposes.

First Example Embodiment

First, an example of the overall image and hardware configuration of a processing system of the present example embodiment will be described with reference to FIG. 1. The inspection site 100 is a site where the moving body 3 is inspected. An inspector having a predetermined qualification (hereinafter, sometimes simply referred to as "inspector") moves the moving body 3 to be inspected, which the inspector is in charge of, into the inspection site 100, and executes various inspections in the inspection site 100. Examples of the moving body 3 include vehicles such as ordinary automobiles, motorcycles, and large vehicles, but are not limited thereto. The inspection includes appearance inspection, performance inspection (such as brake inspection) and the like.

The gate G is a gate for entering the inspection site 100. The gate control apparatus 2 controls the opening and closing of the gate G. That is, the gate G is automatically opened and closed under the control of the gate control apparatus 2. In the present example embodiment, an authentication process is executed in front of the gate G to determine whether or not the person who is moving the moving body 3 into the inspection site 100 is a valid inspector, by using the biological information. When the authentication is successful (when the person is a valid inspector), the gate G is opened. As a result, the inspector can move the moving body 3 into the inspection site 100 and execute various inspections in the inspection sites 100.

On the other hand, when the authentication fails (when the person is not a valid inspector), the gate G is not opened. As a result, the person cannot move the moving body 3 into the inspection site 100 and cannot inspect the moving body 3.

The sensor P is an apparatus which detects that the moving body 3 is in a specified position in front of the gate G. The configuration of the sensor P is not limited. For example, the sensor P may detect the moving body 3 at a specified position by emitting electromagnetic waves and detecting the reflected waves. In addition, the sensor P is a sensor that measures the weight of the object, and may detect that the moving body 3 is at a specified position in front of the gate G on the basis of the measurement result. In addition, a camera may be installed in place of the sensor P, and it may be detected by image analysis that the moving body 3 is at a specified position in front of the gate G.

The biological information acquisition apparatuses C1 and C2 are apparatuses that acquire biological information. As the biological information, face information (a face image, a feature value extracted from face image, or the like), fingerprint information (a fingerprint image, a feature value extracted from the fingerprint image, or the like), voice information (a voiceprint image, a feature value extracted from the voiceprint image or audio data), iris information (an iris image, a feature value extracted from the iris image), ear information (information indicating acoustic characteristics of earholes), and vein information (a vein pattern, a feature value extracted from the vein pattern, or the like) are exemplified, but the biological information is not limited thereto.

Examples of the biological information acquisition apparatuses C1 and C2 that acquire biological information include a camera, a fingerprint sensor, a microphone, an earphone, a vein sensor, and the like. It should be noted that, considering that an inspector may wear gloves and it is troublesome for the inspector to take off gloves at every authentication process, the biological information is preferably face information, voice information, iris information, ear information, or the like.

It should be noted that, the biological information acquisition apparatuses C1 and C2 may be installed at positions where biological information can be acquired from an inspector riding on the moving body 3. In this way, the inspector can avoid the trouble of getting off the moving body 3 for the authentication process. In the illustrated example, in order to adapt to both the cases where the moving body 3 is right-hand drive and left-hand drive, two biological information acquisition apparatuses C1 and C2 are installed on both the left and right sides of the moving body 3 which is at the specified position. It should be noted that, only one of the biological information acquisition apparatus C1 and the biological information acquisition apparatus C2 may be installed. Further, the biological information acquisition apparatus C1 and/or the biological information acquisition apparatus C2 may be installed at a position where the inspector gets off from the moving body 3 and operates.

The switches S1 and S2 receive a user input that requests to start authentication. The switches S1 and S2 receive the user input through any input apparatus such as a rope switch, a physical button, a touch panel, a microphone, a mouse, or a keyboard.

It should be noted that, the switches S1 and S2 may be installed at positions where an inspector riding on the moving body 3 can operate them. In this way, the inspector can avoid the trouble of getting off the moving body 3 for the authentication process. In the illustrated example, in order to adapt to both the cases where the moving body 3 is right-hand drive and left-hand drive, two switches S1 and S2 are installed on both the left and right sides of the moving body 3 which is at the specified position. It should be noted that, only one of the switch S1 and the switch S2 may be installed. Further, the switch S1 and/or the switch S2 may be installed at a position where the inspector gets off from the moving body 3 and operates.

The output apparatus D outputs various types of information such as authentication results. The output apparatus D is a display, a speaker, a warning lamp, a projection apparatus, or the like, but is not limited thereto.

The processing apparatus 1 communicates with the switches S1 and S2, the biological information acquisition apparatuses C1 and C2, and the sensor P, and acquires information acquired and generated by the switches S1 and S2, the biological information acquisition apparatuses C1 and C2, and the sensor P. Then, the processing apparatus 1 executes an authentication process based on the acquired information. Then, the processing apparatus 1 transmits the authentication result to the output apparatus D for output, or transmits an instruction signal for opening the gate G to the gate control apparatus 2 on the basis of the authentication result. The installation position of the processing apparatus 1 is not particularly limited, and may be installed near the gate G or may be installed at a position away from the gate G.

Here, an example of a hardware configuration of the processing apparatus 1 will be described. Each functional unit included in the processing apparatus 1 is configured by any combination of hardware and software, mainly using a central processing unit (CPU) of any computer, a memory, a program to be loaded into the memory, and a storage unit such as a hard disk storing the program (which can store programs stored in advance in the stage of shipping the apparatus, and also store programs downloaded from a storage medium such as a compact disc (CD) or a server on the Internet), and a network connection interface. Those skilled in the art will understand that there are various modifications in the configuration methods and apparatuses.

It should be noted that, in FIG. 1, the switches S1 and S2, the biological information acquisition apparatuses C1 and C2, the sensor P, the output apparatus D, the gate control apparatus 2 and the processing apparatus 1 are shown separately, but they may be physically and/or logically separated, or at least a part may be physically and logically integrated.

Figure 2:
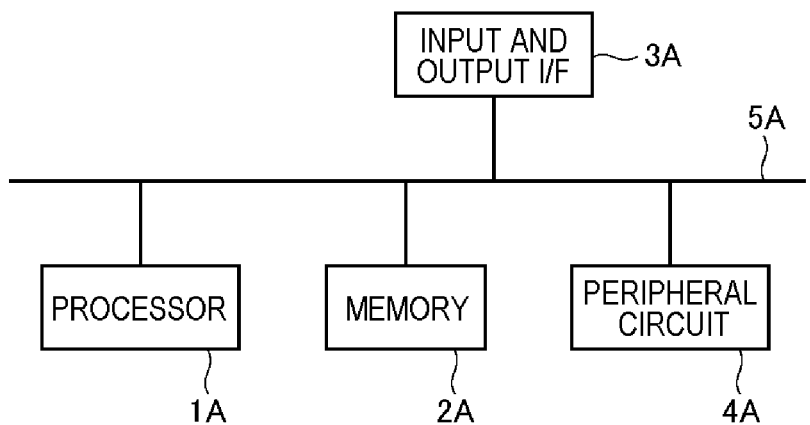
FIG. 2 is a diagram illustrating an example of a hardware configuration of a processing apparatus according to the present example embodiment.

FIG. 2 is a block diagram illustrating a hardware configuration of the processing apparatus 1. As illustrated in FIG. 2, the processing apparatus 1 includes a processor 1A, a memory 2A, an input and output interface 3A, a peripheral circuit 4A, and a bus 5A. The peripheral circuit 4A includes various modules. The processing apparatus 1 may not have the peripheral circuit 4A. It should be noted that, the processing apparatus 1 may be configured by a plurality of apparatuses that are physically and/or logically separated. In this case, each of the plurality of apparatuses can be provided with the hardware configuration.

The bus 5A is a data transmission path through which the processor 1A, the memory 2A, the peripheral circuit 4A, and the input and output interface 3A mutually transmit and receive data. The processor 1A is, for example, an arithmetic processing apparatus such as a central processing unit (CPU) or a graphics processing unit (GPU). The memory 2A is, for example, a memory such as a random access memory (RAM) or a read only memory (ROM). The input and output interface 3A includes an interface for acquiring information from an input apparatus, an external apparatus, an external server, an external sensor, a camera, and the like, and an interface for outputting information to an output apparatus, an external apparatus, an external server, and the like. The input apparatus is, for example, a keyboard, a mouse, a microphone, a physical button, a touch panel, or the like. The output apparatus is, for example, a display, a speaker, a printer, an emailer, or the like. The processor 1A can issue a command to each module and execute a calculation based on the calculation results.

It should be noted that, in this specification, "acquisition" includes at least one of "obtaining, by the own apparatus, data stored in other apparatuses or storage media (active acquisition)", based on user input or program instructions, for example, requesting or querying other apparatuses and receiving the data, accessing other apparatuses and storage media and reading the data, or the like, and "inputting data output from other apparatuses to the own apparatus (passive acquisition)", based on user input or program instructions, for example, receiving data delivered (or transmitted, push notified), and selecting and acquiring data or information from the received data or information, and "generating new data by editing data (conversion to text, data rearrangement, partial data extraction, file format change), and acquiring the new data".

Figure 3:
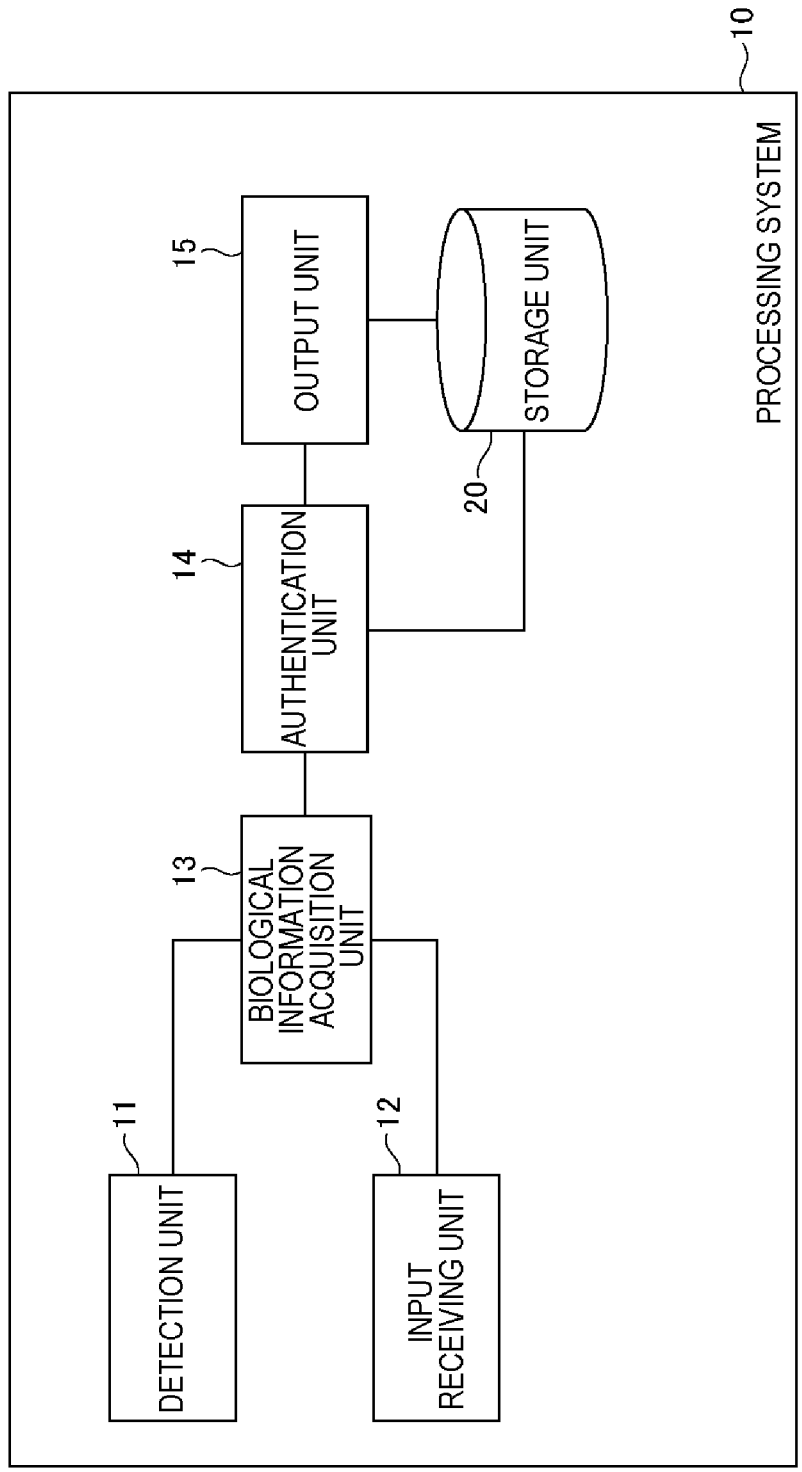
FIG. 3 is an example of a functional block diagram of a processing system according to the present example embodiment.

Next, the configuration of the processing system 10 will be described. FIG. 3 shows an example of a functional block diagram of the processing system 10. As illustrated, the processing system 10 includes a detection unit 11, an input receiving unit 12, a biological information acquisition unit 13, an authentication unit 14, an output unit 15, and a storage unit 20.

The detection unit 11 detects that the moving body 3 is at the specified position. The detection unit 11 is a functional unit realized by the sensor P in FIG. 1, or the like. The specified position is an any position in front of the gate G.

The input receiving unit 12 receives a user input that requests to start authentication. The input receiving unit 12 is a functional unit realized by the switches S1 and S2 in FIG. 1, or the like. It should be noted that, the input receiving unit 12 may receive a user input that requests to start authentication.

The biological information acquisition unit 13 executes an acquisition process of acquiring biological information. The biological information acquisition unit 13 is a functional unit realized by the biological information acquisition apparatuses C1 and C2 in FIG. 1, or the like. It should be noted that, the biological information acquisition unit 13 may be a functional unit realized by the biological information acquisition apparatuses C1 and C2 and the processing apparatus 1 in FIG. 1, or the like. The biological information acquisition apparatuses C1 and C2 acquire data such as face images, fingerprint images, voiceprint images, audio data, iris images, information indicating acoustic characteristics of ear holes, and vein images.

It should be noted that, the biological information acquisition apparatuses C1 and C2 or the processing apparatus 1 may generate a feature value extracted from face image, a feature value extracted from the fingerprint image, a feature value extracted from the voiceprint image or audio data, a feature value extracted from the iris image, information indicating acoustic characteristics of earholes, a feature value extracted from the vein pattern, or the like, based on the data acquired by the biological information acquisition apparatuses C1 and C2.

When a user input that requests to start authentication is received in a state where the moving body is detected to be at the specified position, the biological information acquisition unit 13 executes an acquisition process (image generation, recording, or the like) in response to the user input. When a user input that requests to start authentication is received in a state where the moving body 3 is not detected to be at the specified position, the biological information acquisition unit 13 does not execute an acquisition process.

For example, the processing apparatus 1 in FIG. 1 acquires information indicating that a user input that requests to start authentication has been received from the switches S1 and S2. Further, the processing apparatus 1 acquires information indicating whether or not the moving body 3 is detected at the specified position from the sensor P. Then, based on the information acquired from the switches S1 and S2 and the sensor P, the processing apparatus 1 determines whether or not a user input that requests to start authentication is received in a state where the moving body 3 is detected to be at the specified position. When it is determined that a user input that requests to start authentication is received in a state where the moving body is detected to be at the specified position, the processing apparatus 1 causes the biological information acquisition apparatuses C1 and C2 to execute an acquisition process of acquiring the biological information.

Returning to FIG. 3, the authentication unit 14 executes an inspector authentication process based on the biological information acquired through the acquisition process by the biological information acquisition unit 13. The authentication unit 14 is a functional unit realized by the processing apparatus 1 in FIG. 1, or the like.

As shown in FIG. 4, inspector identification information for identifying a plurality of inspectors and biological information of each inspector are stored in advance in the storage unit 20 of the processing system 10 in association with each other. Hereinafter, the biological information acquired by the biological information acquisition unit 13 is referred to as "biological information (object to be processed)", and the biological information stored in the storage unit 20 is referred to as "biological information (reference information)". The authentication unit 14 collates biological information (object to be processed) with biological information (reference information) stored in the storage unit 20, and checks whether or not the biological information (object to be processed) is stored in the storage unit 20. If the biological information (object to be processed) is stored in the storage unit 20, the authentication unit 14 determines that the person is a valid inspector (authentication success). On the other hand, if the biological information (object to be processed) is not stored in the storage unit 20, the authentication unit 14 determines that the person is not a valid inspector (authentication failure).

Returning to FIG. 3, the output unit 15 executes an output process based on the authentication result. The output unit 15 is a functional unit realized by the processing apparatus 1, the output apparatus D, the gate control apparatus 2 in FIG. 1, or the like.

The output unit 15 opens the gate G when the authentication result is an authentication success. For example, the processing apparatus 1 of FIG. 1 transmits an instruction signal for opening the gate G to the gate control apparatus 2, when the authentication result is an authentication success. The gate control apparatus 2 executes a process of opening the gate G in response to the instruction signal.

Further, the output unit 15 can execute a process of notifying the authentication result. For example, the processing apparatus 1 in FIG. 1 transmits the authentication result to the output apparatus D and causes the output apparatus D to output the authentication result.

It should be noted that, the output unit 15 may generate an entrance history as shown in FIG. 5 and store it in the storage unit 20. When the gate G is opened in response to the authentication success, the output unit 15 stores the date and time at that time and the inspector identification information in the storage unit 20 in association with each other.

Next, an example of the processing flow of the processing system 10 will be described with use of the flowchart of FIG. 6.

When the input receiving unit 12 receives a user input that requests to start authentication (Yes in S10), the biological information acquisition unit 13 determines whether or not the moving body 3 is detected to be at the specified position at that time, based on the detection result of the detection unit 11 (S11).

When the moving body 3 is at the specified position (Yes in S11), the biological information acquisition unit 13 executes an acquisition process of acquiring biological information (object to be processed) (S12). The authentication unit 14 executes an inspector authentication process based on the biological information (processing object) acquired in the step S12 (S13). Specifically, the authentication unit 14 collates biological information (object to be processed) with biological information (reference information) stored in the storage unit 20 of the processing system 10 in advance, and checks whether or not the biological information (object to be processed) is stored in the storage unit 20. If the biological information (object to be processed) is stored in the storage unit 20, the authentication unit 14 determines that the person is a valid inspector (authentication success). On the other hand, if the biological information (object to be processed) is not stored in the storage unit 20, the authentication unit 14 determines that the person is not a valid inspector (authentication failure).

Figure 7:
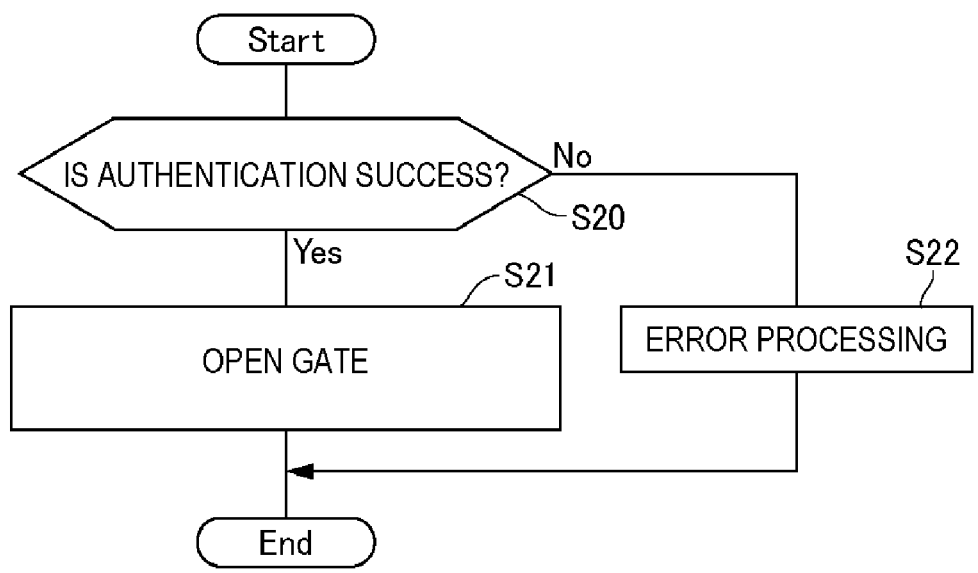
FIG. 7 is a flowchart showing an example of a processing flow of the processing system of the present example embodiment.

The output unit 15 executes an output process based on the authentication result (S14). An example of the processing flow of the step S14 will be described with use of the flowchart of FIG. 7.

In a case where the authentication result is an authentication success (Yes in S20), the output unit 15 opens the gate G. For example, the processing apparatus 1 of FIG. 1 transmits an instruction signal for opening the gate G to the gate control apparatus 2, when the authentication result is an authentication success. The gate control apparatus 2 executes a process of opening the gate G in response to the instruction signal. The output unit 15 may update the entrance history (see FIG. 5) stored in the storage unit 20, when the instruction signal to open the gate G is transmitted to the gate control apparatus 2 in response to the authentication success. That is, the output unit 15 may store the date and time at that time and the inspector identification information in the storage unit 20 in association with each other.

It should be noted that, the processing apparatus 1 transmits an instruction signal for opening the gate G to the gate control apparatus 2 and then monitors whether the condition for closing the gate G is satisfied. When it is detected that the condition is satisfied, the processing apparatus 1 may transmit the instruction signal for closing the gate G to the gate control apparatus 2. The gate control apparatus 2 executes a process of closing the gate G in response to the instruction signal. The above condition is "a predetermined time has elapsed since the instruction signal to open the gate G is transmitted to the gate control apparatus 2", "the moving body 3 is no longer detected at the specified position (detection of a change from detection to non-detection)", "a predetermined time has elapsed since the moving body 3 is no longer detected at the specified position", or the like, but is not limited thereto.

On the other hand, when the authentication result is an authentication failure (No in S20), the output unit 15 executes error processing (S22). For example, the processing apparatus 1 in FIG. 1 transmits information indicating that the authentication has failed to the output apparatus D, and causes the output apparatus D to output the information.

Returning to FIG. 6, when the moving body 3 is not at the specified position (No in S11), the processes of S12 to S14 by the biological information acquisition unit 13, the authentication unit 14, and the output unit 15 are not executed. In this case, the output unit 15 may notify that the inspector authentication process is not executed because the moving body 3 is not at the specified position. For example, the processing apparatus 1 of FIG. 1 may transmit the notification to the output apparatus D, and cause the output apparatus D to output it.

Next, the advantageous effect of the processing system 10 of the present example embodiment will be described. The processing system 10 of the present example embodiment can execute an inspector authentication process in front of the gate G, and can open the gate G in response to the authentication success. Therefore, it is possible to suppress the occurrence of inconveniences other than the inspector entering the inspection site 100. As a result, it is possible to suppress the occurrence of inconvenience in which a person who is not an inspector inspects the moving body 3.

Further, the processing system 10 of the present example embodiment executes an inspector authentication process using biological information. Therefore, it is possible to effectively suppress the occurrence of fraudulent acts such as impersonating.

Further, according to the processing system 10 of the present example embodiment, when a user input that requests to start authentication is received in a state where the moving body 3 is detected to be at the specified position, the acquisition process of acquiring the biological information is executed, and the inspector authentication process is executed. By providing such conditions, it is possible to effectively suppress inconvenience that a person who is not related to the inspection not accompanied by the moving body 3 enters the inspection site 100. As a result, it is possible to suppress the occurrence of inconvenience in which a person who is not an inspector inspects the moving body 3.

Further, according to the processing system 10 of the present example embodiment, as shown in FIG. 5, the entrance history to the inspection site 100 can be accumulated. By accumulating the entrance history, the occurrence of fraudulent acts can be suppressed.

Second Example Embodiment

An example of the overall image and hardware configuration of the processing system 10 of the present example embodiment is the same as the processing system 10 of the first example embodiment.

An example of a functional block diagram of the processing system 10 is shown in FIG. 3 as in the first example embodiment. The configurations of the detection unit 11, the input receiving unit 12, the output unit 15, and the storage unit 20 are the same as those in the first example embodiment.

When a user input that requests to start authentication is received by the input receiving unit 12, the biological information acquisition unit 13 executes an acquisition process (image generation, recording, or the like) in response to the user input. That is, the biological information acquisition unit 13 of the present example embodiment executes the acquisition process (image generation, recording, or the like) in response to the user input, regardless of whether or not the moving body 3 is detected to be at the specified position. Other configurations of the biological information acquisition unit 13 are the same as those in the first example embodiment.

The authentication unit 14 executes an inspector authentication process, when a user input that requests to start authentication is received by the input receiving unit 12 in a state where the moving body 3 is detected to be at the specified position. The authentication unit 14 does not execute the inspector authentication process when the user input that requests the authentication start is received by the input receiving unit 12 in a state where the moving body 3 is not detected to be at the specified position. Other configurations of the authentication unit 14 are the same as those in the first example embodiment.

Figure 8:
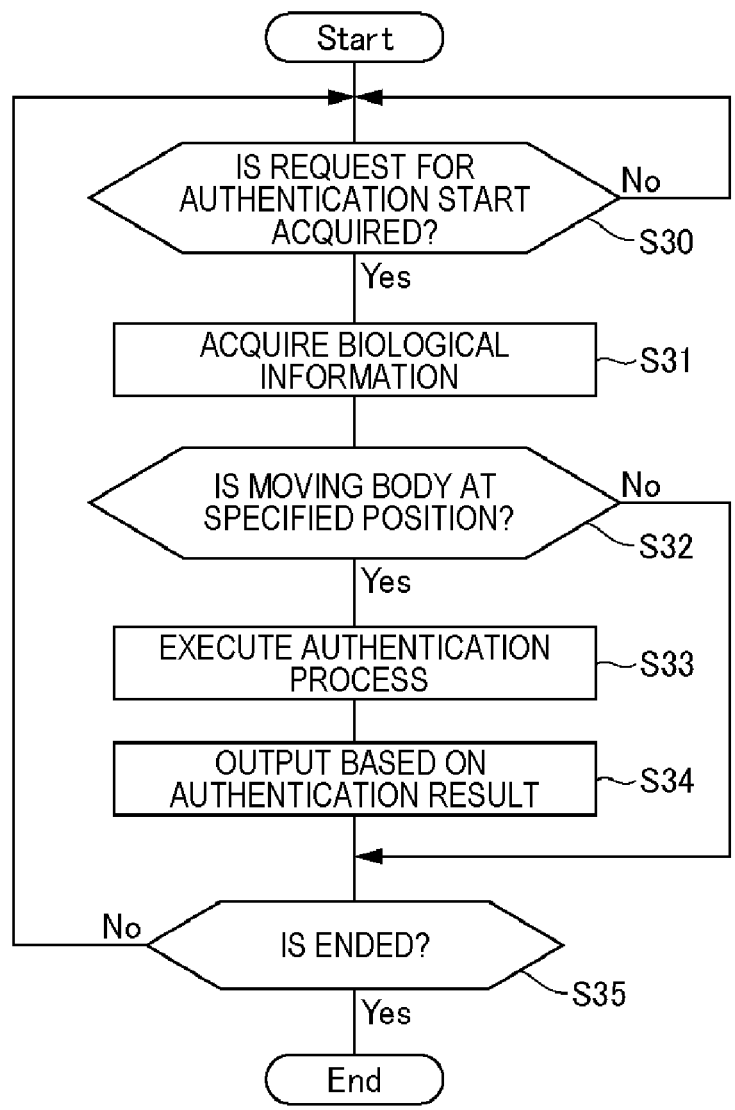
FIG. 8 is a flowchart showing an example of a processing flow of the processing system of the present example embodiment.

Next, an example of the processing flow of the processing system 10 will be described with use of the flowchart of FIG. 8. It should be noted that, the description of points in common with the flowchart of FIG. 6 is omitted as appropriate.

When the input receiving unit 12 receives a user input that requests the start of authentication (Yes in S30), the biological information acquisition unit 13 executes an acquisition process of acquiring biological information (object to be processed) (S31). Next, based on the detection result of the detection unit 11, the authentication unit 14 determines whether or not the moving body 3 is detected to be at the specified position at that time when the input receiving unit 12 receives a user input that requests to start authentication (S32).

When the moving body 3 is at the specified position (Yes in S32), the authentication unit 14 executes an inspector authentication process based on the biological information (object to be processed) acquired in S31 (S33).

The output unit 15 executes an output process based on the authentication result (S34). An example of the processing flow of S34 is the same as the example of the processing flow of S14 described in the first example embodiment.

On the other hand, when the moving body 3 is not at the specified position (No in S32), the process of S33 and S34 by the authentication unit 14 and the output unit 15 is not executed. In this case, the output unit 15 may notify that the inspector authentication process is not executed because the moving body 3 is not at the specified position. For example, the processing apparatus 1 of FIG. 1 may transmit the notification to the output apparatus D, and cause the output apparatus D to output it.

According to the processing system 10 of the present example embodiment described above, the same advantageous effects as those of the first example embodiment can be realized.

Third Example Embodiment

An example of the overall image and hardware configuration of the processing system 10 of the present example embodiment is the same as the processing system 10 of the first example embodiment.

An example of a functional block diagram of the processing system 10 is shown in FIG. 3 as in the first example embodiment. The configurations of the detection unit 11, the input receiving unit 12, the authentication unit 14, and the storage unit 20 are the same as those in the first example embodiment.

When a user input that requests to start authentication is received by the input receiving unit 12, the biological information acquisition unit 13 executes an acquisition process (image generation, recording, or the like) in response to the user input. That is, the biological information acquisition unit 13 of the present example embodiment executes the acquisition process (image generation, recording, or the like) in response to the user input, regardless of whether or not the moving body 3 is detected to be at the specified position. Other configurations of the biological information acquisition unit 13 are the same as those in the first example embodiment.

When a user input that requests to start authentication is received by the input receiving unit 12 in a state where the moving body 3 is detected to be at the specified position, and the authentication result is an authentication success, the output unit 15 executes a predetermined output process (for opening the gate G). Even if the authentication result is an authentication success, the authentication unit 14 does not execute the predetermined output process (for opening the gate G), when the user input that requests the authentication start is received by the input receiving unit 12 in a state where the moving body 3 is not detected to be at the specified position. Other configurations of the output unit 15 are the same as those in the first example embodiment.

Figure 9:
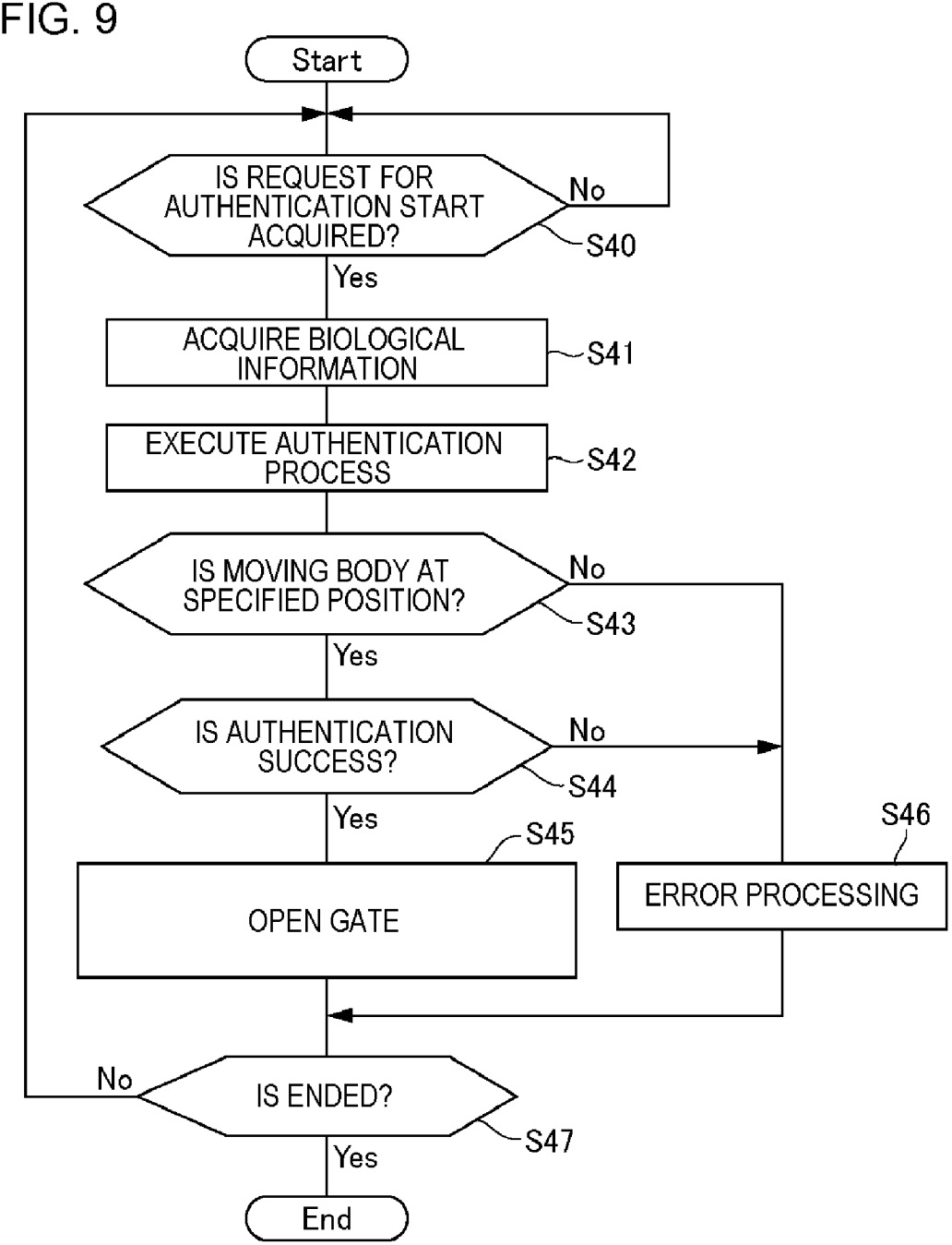
FIG. 9 is a flowchart showing an example of a processing flow of the processing system of the present example embodiment.

Next, an example of the processing flow of the processing system 10 will be described with use of the flowchart of FIG. 9. It should be noted that, the description of points in common with the flowchart of FIG. 6 is omitted as appropriate.

When the input receiving unit 12 receives a user input that requests the start of authentication (Yes in S40), the biological information acquisition unit 13 executes an acquisition process of acquiring biological information (object to be processed) (S41). Next, the authentication unit 14 executes an inspector authentication process based on the biological information (processing object) acquired in the step S41 (S42).

Next, based on the detection result of the detection unit 11, the output unit 15 determines whether or not the moving body 3 is detected to be at the specified position at that time when the input receiving unit 12 receives a user input that requests to start authentication (S43). Further, the output unit 15 determines whether or not the authentication result is an authentication success (S44).

When the moving body 3 is at the specified position (Yes in S43) and the authentication result is an authentication success (Yes in S44), the output unit 15 opens the gate G.

On the other hand, when the moving body 3 is not at the specified position (No in S43) or when the authentication result is an authentication failure (No in S44), the output unit 15 executes error processing (S46). For example, the output unit 15 may notify that the gate G is not opened because the moving body 3 is not at the specified position or because the inspector authentication process has failed. For example, the processing apparatus 1 of FIG. 1 may transmit the notification to the output apparatus D, and cause the output apparatus D to output it.

According to the processing system 10 of the present example embodiment described above, the same advantageous effects as those of the first example embodiment can be realized.

Fourth Example Embodiment

First, an example of the overall image and hardware configuration of a processing system 10 of the present example embodiment will be described with reference to FIG. 10. The hardware configuration of the processing system 10 of the present example embodiment is different from the processing system 10 of the first to third example embodiments in that it includes input apparatuses M1 and M2. Other hardware configurations are the same as those in any of the first to third example embodiments.

The input apparatuses M1 and M2 are apparatuses that receive input of moving body identification information for identifying a plurality of moving bodies 3 from each other. The input apparatuses M1 and M2 may be readers that read a code (bar code, two-dimensional code, or the like) indicating moving body identification information, for example. In addition, the input apparatuses M1 and M2 may be apparatuses such as a physical button, a touch panel, a microphone, a mouse, and a keyboard that receive input of moving body identification information.

It should be noted that, the input apparatuses M1 and M2 may be installed at positions where an inspector riding on the moving body 3 can operate them. In this way, the inspector can avoid the trouble of getting off the moving body 3 in order to input the moving body identification information. In the illustrated example, in order to adapt to both the cases where the moving body 3 is right-hand drive and left-hand drive, two input apparatuses M1 and M2 are installed on both the left and right sides of the moving body 3 which is at the specified position. It should be noted that, only one of the input apparatuses M1 and M2 may be installed. Further, the input apparatus M1 and/or the input apparatus M2 may be installed at a position where the inspector gets off from the moving body 3 and operates.

Figure 10:
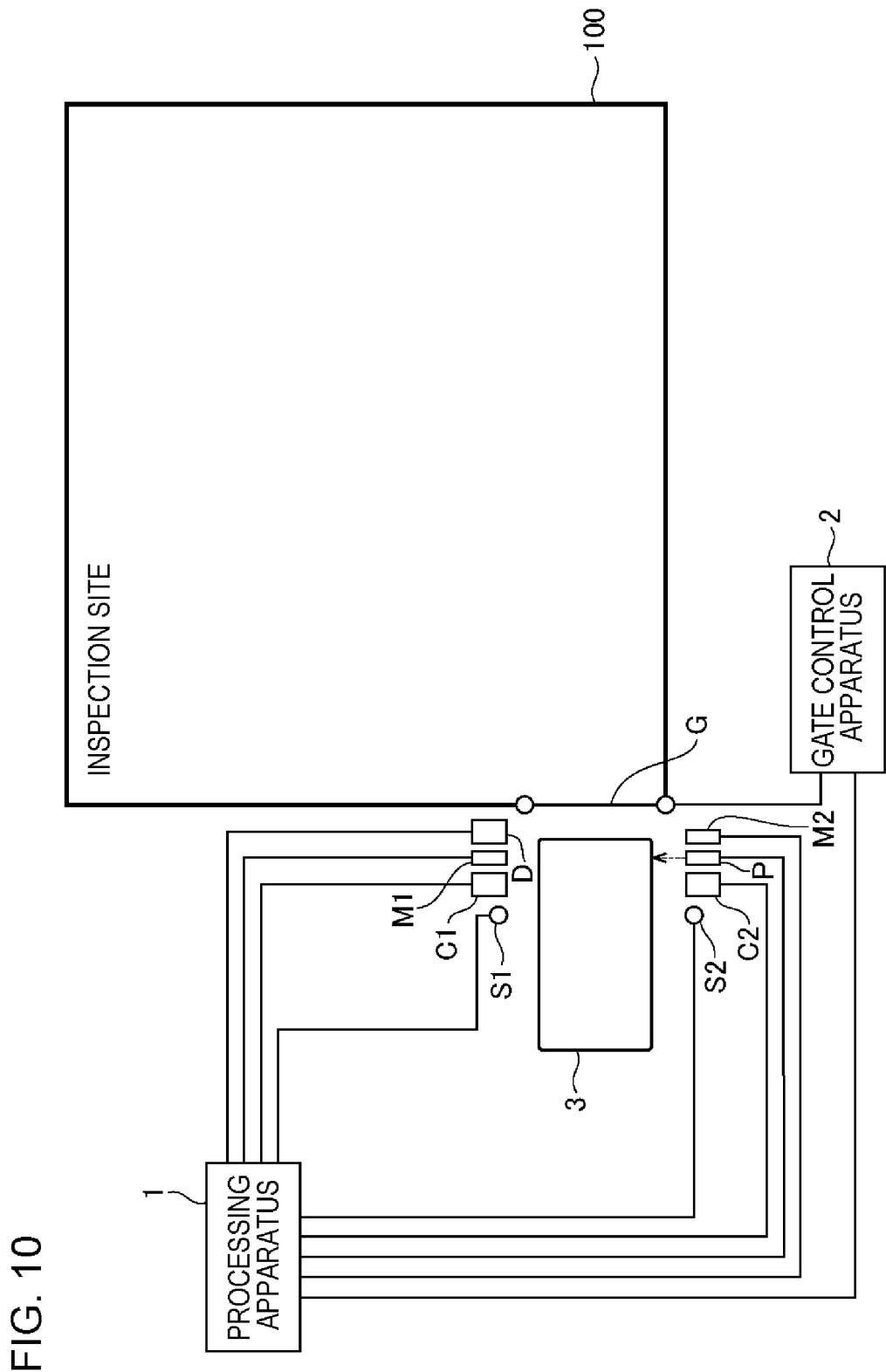
FIG. 10 is a diagram illustrating an example of an overall image of a processing system according to the present example embodiment.

It should be noted that, in FIG. 10, the switches S1 and S2, the biological information acquisition apparatuses C1 and C2, the sensor P, the output apparatus D, the input apparatuses M1 and M2, the gate control apparatus 2 and the processing apparatus 1 are shown separately, but they may be physically and/or logically separated, or at least a part may be physically and logically integrated.

Figure 11:
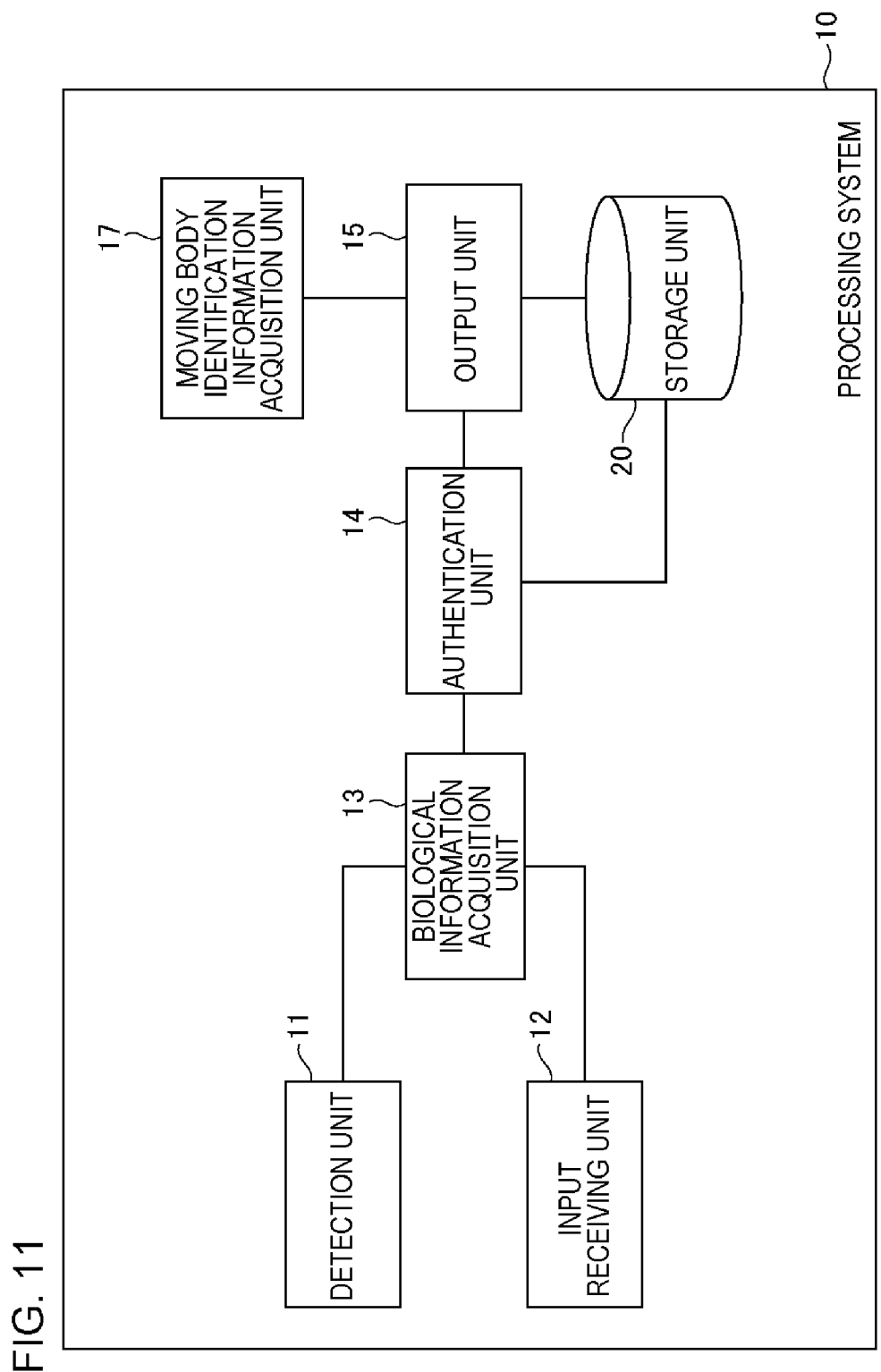
FIG. 11 is an example of a functional block diagram of a processing system according to the present example embodiment.

FIG. 11 shows an example of a functional block diagram of the processing system 10. As illustrated, the processing system 10 includes a detection unit 11, an input receiving unit 12, a biological information acquisition unit 13, an authentication unit 14, an output unit 15, a moving body identification information acquisition unit 17, and a storage unit 20. The configurations of the detection unit 11, the input receiving unit 12, the biological information acquisition unit 13, the authentication unit 14, and the storage unit 20 are the same as those in any of the first to third example embodiments.

The moving body identification information acquisition unit 17 acquires moving body identification information. The moving body identification information acquisition unit 17 is a functional unit realized by the input apparatuses M1 and M2 in FIG. 10, or the like.

The output unit 15 stores, in the storage unit 20, the moving body identification information acquired by the moving body identification information acquisition unit 17 as a part of the entrance history as shown in FIG. 12. The entrance history shown in FIG. 12 is different from the entrance history shown in FIG. 5 described above in that it has an item of moving body identification information.

Other configurations and an example of the processing flow of the processing system 10 are the same as those in any of the first to third example embodiments.

According to the processing system 10 of the present example embodiment described above, the same advantageous effects as those of the first to third example embodiments can be realized. Further, according to the processing system 10 of the present example embodiment, it is possible to accumulate a history indicating which moving body 3 the inspector who enters the inspection site 100 has. By accumulating more detailed information related to entrance, the occurrence of fraudulent acts can be suppressed.

Fifth Example Embodiment

First, an example of the overall image and hardware configuration of a processing system 10 of the present example embodiment will be described with reference to FIG. 13. In the present example embodiment, inspection sites 101 and 102 for executing each of a plurality of inspections (appearance inspection, brake inspection, or the like) are predetermined.

It should be noted that, the plurality of inspection sites 101 and 102 and the like may exist together in a place where a predetermined inspection is executed. For example, the plurality of inspection sites 101 and 102 may be located in the inspection site 100 of FIG. 1. In this case, the processing system 10 according to the present example embodiment may be provided with "the function of executing biological authentication in front of the gate G and controlling the opening and closing of the gate G based on the result of biological authentication" described in the first to fourth example embodiments.

In addition, the plurality of inspection sites 101, 102, and the like do not exist together in one place as described above, and may be interspersed. In this case, the processing system 10 according to the present example embodiment may not be provided with "the function of executing biological authentication in front of the gate G and controlling the opening and closing of the gate G based on the result of biological authentication" described in the first to fourth example embodiments.

The switches S1 and S2, the biological information acquisition apparatuses C1 and C2, the sensors P, the output apparatus D, and the input apparatuses M1 and M2 are installed at the inspection site where each inspection is executed.

It should be noted that, the switches S1 and S2, the biological information acquisition apparatuses C1 and C2, the sensor P, the output apparatus D, the input apparatuses M1 and M2, and the processing apparatus 1 may be physically and/or logically separated, or at least a part may be physically and logically integrated.

Further, only one of the switches S1 and S2 may be installed at each inspection site. Further, only one of the biological information acquisition apparatuses C1 and C2 may be installed. Further, only one of the input apparatuses M1 and M2 may be installed.

The configurations of the switches S1 and S2, the biological information acquisition apparatuses C1 and C2, the sensor P, the output apparatus D, the input apparatuses M1 and M2 are the same as those in any of the first to fourth example embodiments.

Although not shown, the processing system 10 includes the processing apparatus 1. The switches S1 and S2, the biological information acquisition apparatuses C1 and C2, the sensors P, the output apparatus D, and the input apparatuses M1 and M2 are configured to be able to communicate with the processing apparatus 1.

Figure 14:
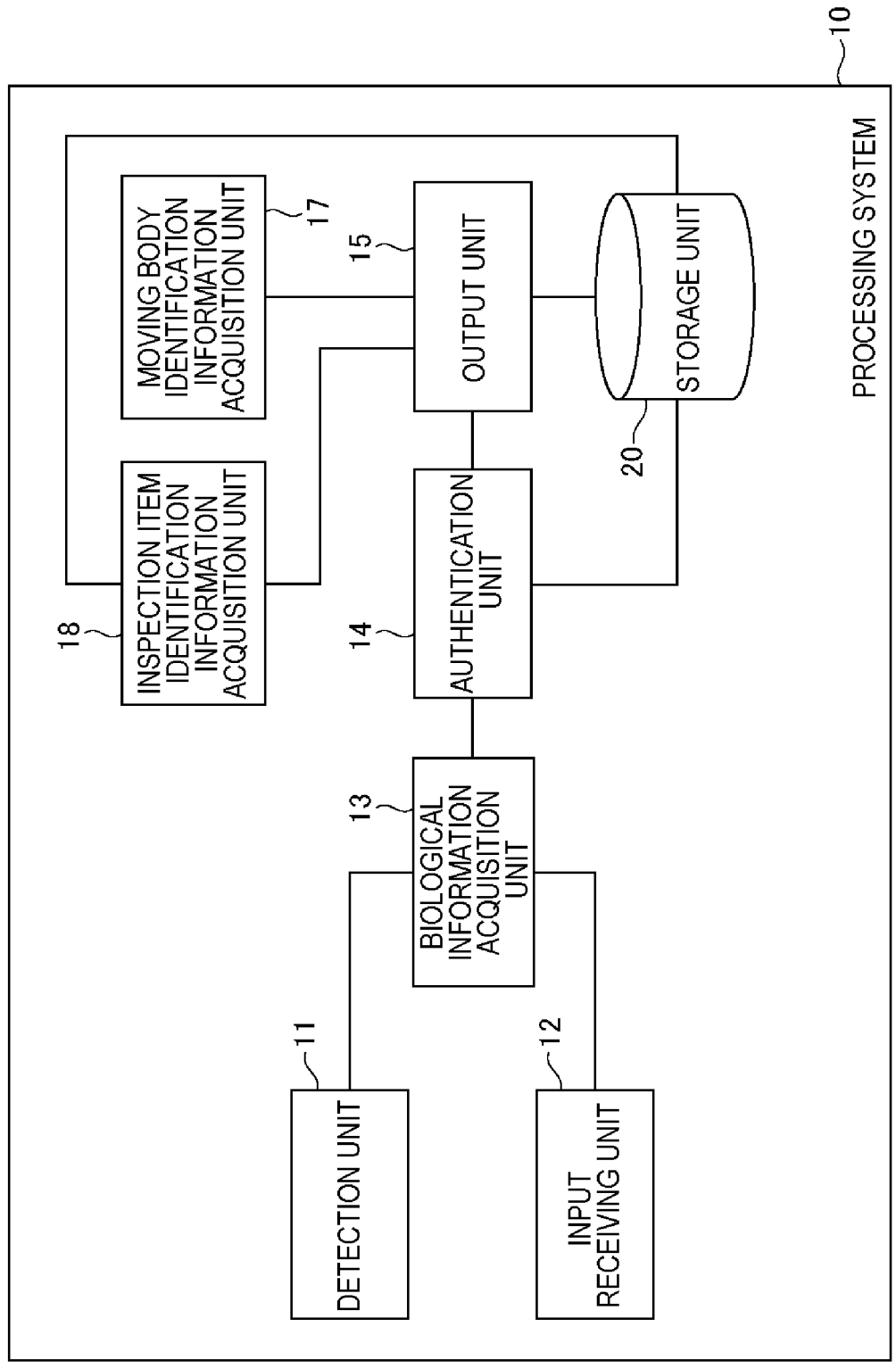
FIG. 14 is an example of a functional block diagram of a processing system according to the present example embodiment.

FIG. 14 shows an example of a functional block diagram of the processing system 10. As illustrated, the processing system 10 includes a detection unit 11, an input receiving unit 12, a biological information acquisition unit 13, an authentication unit 14, an output unit 15, a moving body identification information acquisition unit 17, an inspection item identification information acquisition unit 18, and a storage unit 20.

The configurations of the detection unit 11, the input receiving unit 12, the biological information acquisition unit 13, the authentication unit 14, and the moving body identification information acquisition unit 17 are the same as those in any of the first to fourth example embodiments.

The inspection item identification information acquisition unit 18 acquires inspection item identification information for identifying an inspection item. The inspection item identification information acquisition unit 18 is a functional unit realized by the processing apparatus 1 or the like.

Figure 13:
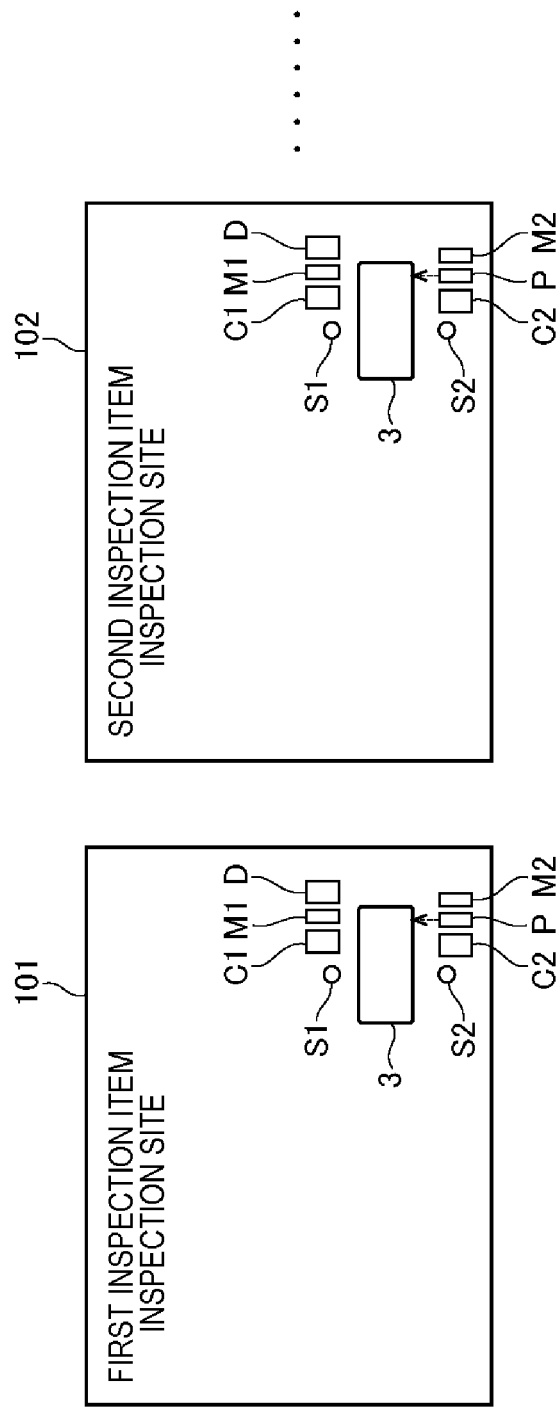
FIG. 13 is a diagram illustrating an example of an overall image of a processing system according to the present example embodiment.

As shown in FIG. 13, the switches S1 and S2, the biological information acquisition apparatuses C1 and C2, the sensors P, the output apparatus D, and the input apparatuses M1 and M2 are installed at the inspection sites 101 and 102 where each inspection is executed. Therefore, as shown in FIG. 15, in advance, correspondence information in which inspection item identification information for inspections executed at the inspection sites 101 and 102 and terminal identification information of terminals (the switches S1 and S2, the biological information acquisition apparatuses C1 and C2, the sensor P, the output apparatus D, the input apparatuses M1 and M2, and the like) installed in the inspection sites 101 and 102 are associated with each other may be generated and stored in the storage unit 20. The inspection item identification information acquisition unit 18 may acquire the inspection item identification information associated with the terminal that is the transmission source of the information acquired by the detection unit 11, the input receiving unit 12, or the biological information acquisition unit 13 with reference to the correspondence information shown in FIG. 15.

That is, the inspection item identification information acquisition unit 18 may acquire the inspection item identification information, based on the moving body identification information or the terminal identification information of the terminal that has acquired the biological information, and the correspondence information in which the terminal identification information and the inspection item identification information are associated with each other.

In addition, each inspector may input the inspection item identification information via the input apparatuses M1 and M2. The inspection item identification information acquisition unit 18 may acquire the inspection item identification information input via the input apparatuses M1 and M2.

The output unit 15 illustrated in FIG. 14 stores, in the storage unit 20, the moving body identification information acquired by the moving body identification information acquisition unit 17, the inspection item identification information acquired by the inspection item identification information acquisition unit 18, and the inspector identification information of the inspector authenticated in the inspector authentication process executed by the authentication unit 14 in association with each other.

It should be noted that, although not illustrated, the processing system 10 may further include an inspection date and time acquisition unit that acquires inspection execution date and time information indicating the inspection execution date and time when the inspection is executed at each of the inspection sites 101 and 102. The inspection date and time acquisition unit is a functional unit realized by the processing apparatus 1 or the like. For example, the inspection date and time acquisition unit may acquire the inspection execution date and time information indicating the date and time when the information is acquired, from the terminal that is the transmission source of the information acquired by the detection unit 11, the input receiving unit 12, or the biological information acquisition unit 13. In addition, the inspection date and time acquisition unit may acquire the inspection execution date and time information indicating the date and time when the detection unit 11, the input receiving unit 12, or the biological information acquisition unit 13 has acquired various types of information.

The output unit 15 stores the inspection item identification information and the inspection execution date and time information in the storage unit 20 in association with each other.

In addition, although not illustrated, the processing system 10 may further include an inspection result acquisition unit that acquires inspection result information indicating the results of the inspections executed at the inspection sites 101 and 102 and the like. The inspection result acquisition unit is a functional unit realized by the processing apparatus 1 or the like. For example, the input apparatuses M1 and M2 installed in each of the inspection sites 101 and 102 may receive the input of inspection results. Then, the processing apparatus 1 may acquire the inspection result information input to the input apparatuses M1 and M2.

The output unit 15 stores the inspection item identification information and the inspection result information in the storage unit 20 in association with each other.

FIG. 16 schematically shows an example of the inspection history stored in the storage unit 20. In the example shown in FIG. 16, information summarizing the inspection item identification information, the inspector identification information, the inspection result, and the inspection execution date and time is associated with the moving body identification information.

Figure 6:
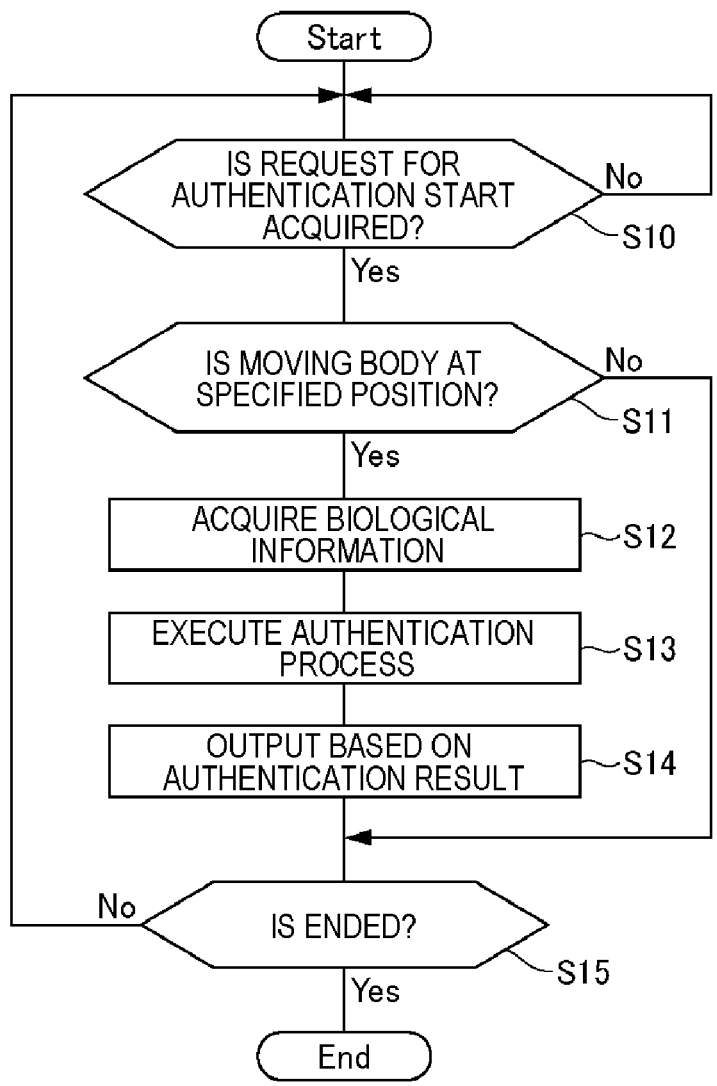
FIG. 6 is a flowchart showing an example of a processing flow of the processing system of the present example embodiment.

An example of the processing flow of the processing system 10 of the present example embodiment is shown in the flowchart of FIG. 6. An example of the processing flow of S14 in FIG. 6 is obtained by changing "the process of opening the gate" in S21 of FIG. 7 to "the process of updating the inspection history of FIG. 16". That is, in S21, the output unit 15 registers the inspection item identification information, the inspector identification information, and the inspection execution date and time information in association with the moving body identification information. It should be noted that, the moving body identification information acquisition unit 17 can acquire moving body identification information at any timing. Further, the inspection item identification information acquisition unit 18 can acquire the inspection item identification information at any timing. Further, the inspection date and time acquisition unit can acquire inspection execution date and time information at any timing.

According to the processing system 10 of the present example embodiment described above, the same advantageous effects as those of the first to fourth example embodiments can be realized. Further, according to the processing system 10 of the present example embodiment, biological authentication can be executed every time a plurality of inspections are executed. Therefore, it is possible to suppress the occurrence of inconvenience in which an unqualified person inspects the moving body 3.

Further, according to the processing system 10 of the present example embodiment, the inspector who has executed each inspection of each moving body 3 can be accumulated as an inspection history. Therefore, it is possible to suppress the occurrence of inconvenience in which an unqualified person inspects the moving body 3.

Sixth Example Embodiment

Figure 17:
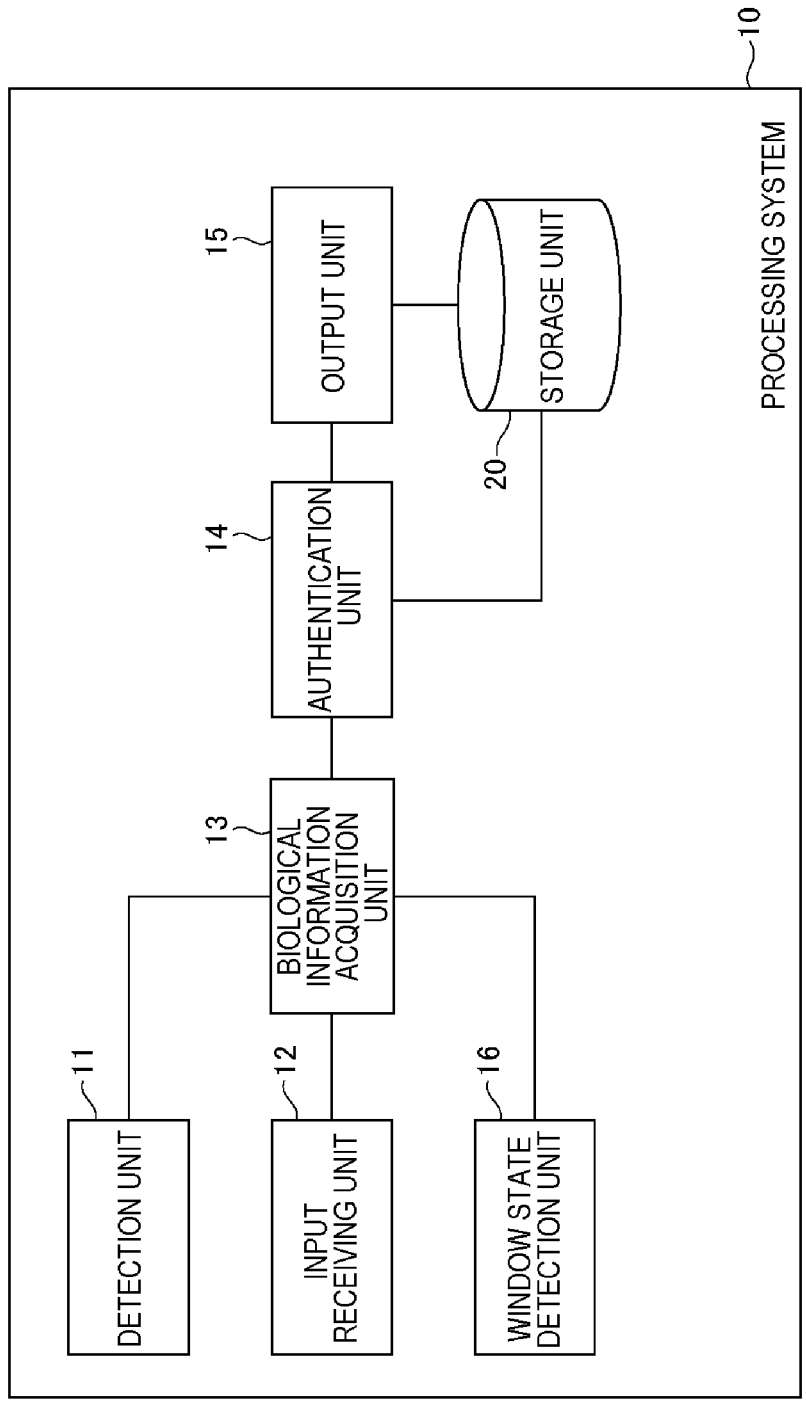
FIG. 17 is an example of a functional block diagram of a processing system according to the present example embodiment.

In the processing system 10 of the present example embodiment, the biological information acquisition apparatuses C1 and C2 are cameras. FIG. 17 shows an example of a functional block diagram of the processing system 10 of the present example embodiment. As illustrated, the processing system 10 includes a detection unit 11, an input receiving unit 12, a biological information acquisition unit 13, an authentication unit 14, an output unit 15, a window state detection unit 16, and a storage unit 20. The processing system 10 may further include at least one of the moving body identification information acquisition unit 17 and the inspection item identification information acquisition unit 18. The configurations of the detection unit 11, the input receiving unit 12, the authentication unit 14, the moving body identification information acquisition unit 17, the inspection item identification information acquisition unit 18, and the storage unit 20 are the same as those in any of the first to fifth example embodiments.

The window state detection unit 16 detects that the window of the moving body 3 is open. The means for detecting whether the window is open is not particularly limited. For example, sensors that emit electromagnetic waves toward the window position of the moving body 3 at a specified position, detect the reflected waves, and measure the distance to the object reflecting the electromagnetic waves may be installed on the right and left sides of the moving body 3 at the specified position. Then, it may be determined that the window is closed when the measured distance is equal to or less than the reference value, and it may be determined that the window is open when the measured distance is greater than the reference value.

When it is detected that the window is open, the biological information acquisition unit 13 images a face of a person riding on the moving body 3 and generates an image, in response to a user input that requests the start of authentication. It should be noted that, when it is detected that the window is open and the moving body 3 is at the specified position, the biological information acquisition unit 13 images a face of a person riding on the moving body 3 and generates an image, in response to a user input that requests the start of authentication. Other configurations of the biological information acquisition unit 13 are the same as those in any of the first to fifth example embodiments.

The output unit 15 can output guidance for prompting the user to open the window through the output apparatus D, when the user input that requests the authentication start is received in a state where the window is not detected to be open. Other configurations of the output unit 15 are the same as those in any of the first to fifth example embodiments.

Other configurations of the processing system 10 are the same as those in any of the first to fifth example embodiments.

According to the processing system 10 of the present example embodiment described above, the same advantageous effects as those of the first to fifth example embodiments can be realized. Further, according to the processing system 10 of the present example embodiment, when the window of the moving body 3 is closed, and the window glass is present between the inspector riding on the moving body 3 and the camera (biological information acquisition apparatuses C1 and C2), guidance for prompting the user to open the window can be output without executing imaging. Even if the imaging is executed with the window closed, the generated image may be unclear due to light reflection on the window glass. By avoiding imaging in such a state, unnecessary imaging and image analysis can be avoided, and the processing load on the processing system 10 can be reduced. Further, since image analysis processing for unclear images can be avoided, waiting time can be avoided and work efficiency can be improved.

Seventh Example Embodiment

In the processing system 10 of the present example embodiment, the biological information acquisition apparatuses C1 and C2 are cameras. An example of a functional block diagram of the processing system 10 is shown in FIG. 3, 11, 14, or 17. As illustrated, the processing system 10 includes a detection unit 11, an input receiving unit 12, a biological information acquisition unit 13, an authentication unit 14, an output unit 15, and a storage unit 20. Further, the processing system 10 may further include at least one of the window state detection unit 16, the moving body identification information acquisition unit 17, and the inspection item identification information acquisition unit 18. The configurations of the detection unit 11, the input receiving unit 12, the authentication unit 14, the window state detection unit 16, the moving body identification information acquisition unit 17, the inspection item identification information acquisition unit 18, and the storage unit 20 are the same as those in any of the first to sixth example embodiments.

The biological information acquisition unit 13 executes the acquisition process of imaging the face of a person riding on the moving body 3, and generating an image. When a plurality of people are detected within the imaging area, even if the user input that requests the start of authentication is received, the biological information acquisition unit 13 does not execute the acquisition process. That is, when a plurality of people are detected in the image captured in the viewfinder, even if the user input that requests the start of authentication is received, the biological information acquisition unit 13 does not execute imaging. Other configurations of the biological information acquisition unit 13 are the same as those in any of the first to sixth example embodiments.

The output unit 15 can output guidance for prompting one person to be located in the imaging area, through the output apparatus D, when the user input that requests the authentication start is received in a state where a plurality of people are detected in the imaging area. Other configurations of the output unit 15 are the same as those in any of the first to sixth example embodiments.

Other configurations of the processing system 10 are the same as those in any of the first to sixth example embodiments.

According to the processing system 10 of the present example embodiment described above, the same advantageous effects as those of the first to sixth example embodiments can be realized. Further, according to the processing system 10 of the present example embodiment, when a plurality of people are detected in the imaging area (in the image captured in the viewfinder), the guidance for prompting one person to be located in the imaging area can be output without imaging. By avoiding generating an image in a state where a plurality of people are in the image and performing biological authentication based on such an image, it is possible to suppress the occurrence of inconvenience such as erroneous authentication.

Eighth Example Embodiment

In the processing system 10 of the present example embodiment, the biological information acquisition apparatuses C1 and C2 are cameras. An example of a functional block diagram of the processing system 10 is shown in FIG. 3, 11, 14, or 17. As illustrated, the processing system 10 includes a detection unit 11, an input receiving unit 12, a biological information acquisition unit 13, an authentication unit 14, an output unit 15, and a storage unit 20. Further, the processing system 10 may further include at least one of the window state detection unit 16, the moving body identification information acquisition unit 17, and the inspection item identification information acquisition unit 18. The configurations of the detection unit 11, the input receiving unit 12, the window state detection unit 16, the moving body identification information acquisition unit 17, the inspection item identification information acquisition unit 18, and the storage unit 20 are the same as those in any of the first to sixth example embodiments.

The biological information acquisition unit 13 executes the acquisition process of imaging the face of a person riding on the moving body 3, and generating an image. Other configurations of the biological information acquisition unit 13 are the same as those in any of the first to sixth example embodiments.

The authentication unit 14 does not execute the inspector authentication process, when a plurality of people are detected in the image generated by the biological information acquisition unit 13. Other configurations of the authentication unit 14 are the same as those in any of the first to sixth example embodiments.

When the inspector authentication process is not executed because a plurality of people are detected in the image generated by the biological information acquisition unit 13, the output unit 15 can output guidance for prompting one person to be located in the imaging area, through the output apparatus D. Other configurations of the output unit 15 are the same as those in any of the first to sixth example embodiments.

Other configurations of the processing system 10 are the same as those in any of the first to sixth example embodiments.

According to the processing system 10 of the present example embodiment described above, the same advantageous effects as those of the first to sixth example embodiments can be realized. Further, according to the processing system 10 of the present example embodiment, when a plurality of people are detected in the generated image, the guidance for prompting one person to be located in the imaging area can be output without executing the inspector authentication process. By avoiding biological authentication based on an image including a plurality of people, it is possible to suppress the occurrence of inconvenience such as erroneous authentication.

Ninth Example Embodiment

In the processing system 10 of the present example embodiment, the biological information acquisition apparatuses C1 and C2 are cameras. An example of a functional block diagram of the processing system 10 is shown in FIG. 3, 11, 14, or 17. As illustrated, the processing system 10 includes a detection unit 11, an input receiving unit 12, a biological information acquisition unit 13, an authentication unit 14, an output unit 15, and a storage unit 20. Further, the processing system 10 may further include at least one of the window state detection unit 16, the moving body identification information acquisition unit 17, and the inspection item identification information acquisition unit 18. The configurations of the detection unit 11, the input receiving unit 12, the authentication unit 14, the window state detection unit 16, the moving body identification information acquisition unit 17, the inspection item identification information acquisition unit 18, and the storage unit 20 are the same as those in any of the first to eighth example embodiments.

The biological information acquisition unit 13 executes the acquisition process of imaging the face of a person riding on the moving body 3, and generating an image. When the person is detected to be located closer to the camera than the moving body 3 in the image captured in the viewfinder, the biological information acquisition unit 13 does not execute an acquisition process. That is, when the person is detected to be located closer to the camera than the moving body 3 in the image captured in the viewfinder, even if the user input that requests the start of authentication is received, the biological information acquisition unit 13 does not execute imaging. Other configurations of the biological information acquisition unit 13 are the same as those in any of the first to eighth example embodiments.

When the user input that requests the start of authentication is received in a state where the person is detected to be located closer to the camera than the moving body 3 in the image captured in the viewfinder, the output unit 15 can output guidance for prompting the user to execute imaging while riding on the moving body 3. Other configurations of the output unit 15 are the same as those in any of the first to eighth example embodiments.

Other configurations of the processing system 10 are the same as those in any of the first to eighth example embodiments.

According to the processing system 10 of the present example embodiment described above, the same advantageous effects as those of the first to eighth example embodiments can be realized. Further, according to the processing system 10 of the present example embodiment, when the person is detected to be located closer to the camera than the moving body 3 in the image captured in the viewfinder, without executing imaging, it is possible to output guidance for prompting the user to execute imaging while riding on the moving body 3. According to such a processing system 10, it is possible to suppress the occurrence of fraudulent acts that a person having a proper qualification causes the camera to image the face of the person, in the state where a person without a proper qualification rides on the moving body 3 for an inspection.

Tenth Example Embodiment

In the processing system 10 of the present example embodiment, the biological information acquisition apparatuses C1 and C2 are cameras. An example of a functional block diagram of the processing system 10 is shown in FIG. 3, 11, 14, or 17. As illustrated, the processing system 10 includes a detection unit 11, an input receiving unit 12, a biological information acquisition unit 13, an authentication unit 14, an output unit 15, and a storage unit 20. Further, the processing system 10 may further include at least one of the window state detection unit 16, the moving body identification information acquisition unit 17, and the inspection item identification information acquisition unit 18. The configurations of the detection unit 11, the input receiving unit 12, the window state detection unit 16, the moving body identification information acquisition unit 17, the inspection item identification information acquisition unit 18, and the storage unit 20 are the same as those in any of the first to eighth example embodiments.

The biological information acquisition unit 13 executes the acquisition process of imaging the face of a person riding on the moving body 3, and generating an image. Other configurations of the biological information acquisition unit 13 are the same as those in any of the first to eighth example embodiments.

The authentication unit 14 does not execute the inspector authentication process, when a person is located closer to the camera than the moving body 3 in the image generated by the biological information acquisition unit 13. The authentication unit 14 can detect that the person is located closer to the camera than the moving body 3 by analyzing the image. Means for determining the front-rear relationship of a plurality of objects in an image is widely known, and thus description thereof is omitted here. Other configurations of the authentication unit 14 are the same as those in any of the first to eighth example embodiments.

The output unit 15 can output guidance for prompting the user to execute imaging while riding on the moving body 3, when the inspector authentication process is not executed, through the output apparatus D, because the person is detected to be located closer to the camera than the moving body 3 in the image generated by the biological information acquisition unit 13. Other configurations of the output unit 15 are the same as those in any of the first to eighth example embodiments.

Other configurations of the processing system 10 are the same as those in any of the first to eighth example embodiments.

According to the processing system 10 of the present example embodiment described above, the same advantageous effects as those of the first to eighth example embodiments can be realized. Further, according to the processing system 10 of the present example embodiment, when a plurality of people are detected in the generated image, the guidance for prompting one person to be located in the imaging area can be output without executing the inspector authentication process. By avoiding biological authentication based on an image including a plurality of people, it is possible to suppress the occurrence of inconvenience such as erroneous authentication.

Although the present invention has been described above with reference to the example embodiments (and examples), the present invention is not limited to the above example embodiments (and examples). The configuration and details of the present invention can be modified in various ways that can be understood by those skilled in the art within the scope of the present invention.

All or some of the above example embodiments may be listed also in the following notes, but not limited thereto.

1. A processing system including:
a moving body identification information acquisition unit that acquires moving body identification information for identifying a moving body;
an authentication unit that executes an inspector authentication process, based on biological information of an inspector;
an inspection item identification information acquisition unit that acquires inspection item identification information for identifying an inspection item; and
an output unit that stores the moving body identification information, the inspection item identification information, and inspector identification information of the inspector which is authenticated in the inspector authentication process in a storage unit in association with each other.

2. The processing system according to 1,
in which a terminal which acquires the moving body identification information or the biological information is installed at an inspection site of each of a plurality of the inspection items, and
in which the inspection item identification information acquisition unit acquires the inspection item identification information, based on terminal identification information of the terminal which acquires the moving body identification information and the biological information and correspondence information in which the terminal identification information and the inspection item identification information are associated with each other.

3. The processing system according to 1 or 2, further including:
an inspection result acquisition unit that acquires inspection result information,
in which the output unit stores the inspection item identification information and the inspection result information in the storage unit in association with each other.

4. The processing system according to any one of 1 to 3, further including:
an inspection date and time acquisition unit that acquires inspection execution date and time information,
in which the output unit stores the inspection item identification information and the inspection execution date and time information in the storage unit in association with each other.

5. The processing system according to any one of 1 to 4, further including:
a detection unit that detects that the moving body is at a specified position;
an input receiving unit that receives a user input that requests to start authentication; and
a biological information acquisition unit that executes an acquisition process of acquiring biological information, when the user input is received in a state where the moving body is detected to be at the specified position, in which the authentication unit executes the inspector authentication process, based on the biological information acquired in the acquisition process.

6. The processing system according to any one of 1 to 4, further including:
a detection unit that detects that the moving body is at a specified position;
an input receiving unit that receives a user input that requests to start authentication; and
a biological information acquisition unit that executes an acquisition process of acquiring biological information,
in which the authentication unit executes the inspector authentication process, based on the biological information acquired in the acquisition process, when the user input is received in a state where the moving body is detected to be at the specified position.

7. The processing system according to any one of 1 to 4, further including:
a detection unit that detects that the moving body is at a specified position;
an input receiving unit that receives a user input that requests to start authentication; and
a biological information acquisition unit that executes an acquisition process of acquiring biological information,
in which the authentication unit executes the inspector authentication process, based on the biological information acquired in the acquisition process,
the processing system further including an output unit that executes a predetermined output process, when the user input is received in a state where the moving body is detected to be at the specified position and an authentication result is an authentication success.

8. A processing method executed by a computer, the method including:
acquiring moving body identification information for identifying a moving body;
executing an inspector authentication process, based on biological information of an inspector;
acquiring inspection item identification information for identifying an inspection item; and
storing the moving body identification information, the inspection item identification information, and inspector identification information of the inspector which is authenticated in the inspector authentication process in a storage unit in association with each other.

It is apparent that the present invention is not limited to the above example embodiment, and may be modified and changed without departing from the scope and spirit of the invention.

1A: processor
2A: memory
3A: input and output I/F
4A: peripheral circuit
5A: bus
1: processing apparatus
2: gate control apparatus
3: moving body
10: processing system
11: detection unit
12: input receiving unit
13: biological information acquisition unit
14: authentication unit
15: output unit
16: window state detection unit
17: moving body identification information acquisition unit
18: inspection item identification information acquisition unit
20: storage unit
100: inspection site
101: inspection site
102: inspection site
S: switch
C: biological information acquisition apparatus
P: sensor
D: output apparatus
G: gate
M: input apparatus

What is claimed is:

1. A processing system comprising:
at least one memory configured to store one or more instructions; and
at least one processor configured to execute the one or more instructions to:
acquire, from an input apparatus installed at an inspection site, moving body identification information for identifying a moving body;
execute an inspector authentication process, based on biological information of an inspector, the biological information of the inspector is acquired by a biological information acquisition apparatus installed at the inspection site;
acquire inspection item identification information for identifying an inspection item which is included in inspections, including an appearance inspection and a performance inspection, performed on a moving body;
register, in an inspection history stored in a storage unit, the moving body identification information, the inspection item identification information, and inspector identification information of the inspector which is authenticated in the inspector authentication process in association with each other;
execute the inspector authentication process based on an image captured by the biological information acquisition apparatus, and
output guidance prompting one person to be included in the image, when a user input for requesting the inspector authentication process is received in a state where a plurality of people is included in the image.

2. The processing system according to claim 1,
wherein a terminal which acquires the moving body identification information or the biological information is installed at an inspection site of each of a plurality of the inspection items, and
wherein the processor is further configured to execute the one or more instructions to acquire the inspection item identification information, based on terminal identification information of the terminal which acquires the moving body identification information and the biological information and correspondence information in which the terminal identification information and the inspection item identification information are associated with each other.

3. The processing system according to claim 1
wherein the processor is further configured to execute the one or more instructions to:
acquire inspection result information,
store the inspection item identification information and the inspection result information in the storage unit in association with each other.

4. The processing system according to claim 1,
wherein the processor is further configured to execute the one or more instructions to:
acquire inspection execution date and time information, and
store the inspection item identification information and the inspection execution date and time information in the storage unit in association with each other.

5. The processing system according to claim 1,
wherein the processor is further configured to execute the one or more instructions to:
detect that the moving body is at a specified position;
receive a user input that requests to start authentication;
execute an acquisition process of acquiring biological information, when the user input is received in a state where the moving body is detected to be at the specified position, and
execute the inspector authentication process, based on the biological information acquired in the acquisition process.

6. The processing system according to claim 1,
wherein the processor is further configured to execute the one or more instructions to:
detect that the moving body is at a specified position;
receive a user input that requests to start authentication;
execute an acquisition process of acquiring biological information, and
execute the inspector authentication process, based on the biological information acquired in the acquisition process, when the user input is received in a state where the moving body is detected to be at the specified position.

7. The processing system according to claim 1,
wherein the processor is further configured to execute the one or more instructions to:
detect that the moving body is at a specified position;
receive a user input that requests to start authentication;
execute an acquisition process of acquiring biological information,
execute the inspector authentication process, based on the biological information acquired in the acquisition process, and
execute a predetermined output process, when the user input is received in a state where the moving body is detected to be at the specified position and an authentication result is an authentication success.

8. The processing system according to claim 1,
wherein the performance inspection comprises inspecting brakes of the moving body.

9. The processing system according to claim 1,
wherein the inspector is a person having a predetermined qualification to perform the inspection.

10. The processing system according to claim 1,
wherein the at least one processor is further configured to execute the one or more instructions to:
output guidance for prompting the inspector to execute imaging by the biological information acquisition apparatus in a state where inspector is riding on the moving body, when a user input for requesting the inspector authentication process is received in a state where the inspector is detected, in the image, to be closer to the biological information acquisition apparatus than the moving body.

11. A processing method executed by a computer, the method comprising:
acquiring, from an input apparatus installed at an inspection site, moving body identification information for identifying a moving body;
executing an inspector authentication process, based on biological information of an inspector, the biological information of the inspector is acquired by a biological information acquisition apparatus installed at the inspection site;
acquiring inspection item identification information for identifying an inspection item which is included in inspections, including an appearance inspection and a performance inspection, performed on a moving body;
registering, in an inspection history stored in a storage unit, the moving body, identification information, the inspection item identification information, and inspector identification information of the inspector which is authenticated in the inspector authentication process in association with each other;
executing the inspector authentication process based on an image captured by the biological information acquisition apparatus; and
outputting guidance prompting one person to be included in the image, when a user input for requesting the inspector authentication process is received in a state where a plurality of people is included in the image.

* * * * *